US006255245B1

(12) United States Patent
Winkelbach et al.

(10) Patent No.: US 6,255,245 B1
(45) Date of Patent: Jul. 3, 2001

(54) PROCESS FOR THE PREPARATION OF SUPPORTED POLYMERIZATION CATALYST SYSTEMS AND USE THEREOF IN THE HOMO-AND CO-POLYMERIZATION OF UNSATURATED MONOMERS

(75) Inventors: Hans-Rafael Winkelbach, Köln; Peter Schertl, Leverkusen; Wolfgang Nentwig, Bergisch Gladbach, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/329,745

(22) Filed: Jun. 10, 1999

(30) Foreign Application Priority Data

Jun. 16, 1998 (DE) .............................. 198 26 743

(51) Int. Cl.$^7$ .............................. B01J 31/00; B01J 37/00; C08F 4/02; C08F 4/60
(52) U.S. Cl. ......................... 502/104; 502/107; 502/150
(58) Field of Search .................................. 502/104, 107, 502/150

(56) References Cited

U.S. PATENT DOCUMENTS

| | | | |
|---|---|---|---|
| 4,808,561 | 2/1989 | Welborn, Jr. | 502/104 |
| 4,897,455 | 1/1990 | Welborn, Jr. | 526/129 |
| 4,912,075 | 3/1990 | Chang | 502/107 |
| 4,937,217 | 6/1990 | Chang | 502/111 |
| 4,937,301 | 6/1990 | Chang | 526/128 |
| 5,055,438 | 10/1991 | Canich | 502/117 |
| 5,122,491 | 6/1992 | Kioka et al. | 502/117 |
| 5,168,111 | 12/1992 | Canich | 526/160 |
| 5,206,199 | 4/1993 | Kioka et al. | 502/117 |
| 5,324,800 | 6/1994 | Welborn, Jr. | 526/160 |
| 5,580,939 | 12/1996 | Ewen et al. | 526/127 |
| 5,602,067 | 2/1997 | Nowlin et al. | 502/104 |
| 5,633,394 | 5/1997 | Welborn, Jr. et al. | 556/11 |
| 5,688,734 | 11/1997 | Speca et al. | 502/108 |
| 5,703,187 | 12/1997 | Timmers | 526/282 |
| 5,846,896 | 12/1998 | Ewen | 502/117 |
| 5,863,853 | 1/1999 | Vaughan et al. | 502/108 |
| 5,866,663 | 2/1999 | Brookhart et al. | 526/170 |
| 5,886,117 | 3/1999 | Campbell, Jr. | 526/134 |
| 5,886,224 | 3/1999 | Brookhart et al. | 564/272 |
| 5,918,989 | 6/1999 | Brookhart, III et al. | 526/348.6 |

FOREIGN PATENT DOCUMENTS

| | | |
|---|---|---|
| 2200243 | 9/1997 | (CA) . |
| 0 474 391 | 10/1995 | (EP) . |
| 0 509 294 | 5/1997 | (EP) . |
| 0 798 315 | * 10/1997 | (EP) . |
| 96/00243 | 1/1996 | (WO) . |
| 98/18842 | 5/1998 | (WO) . |

OTHER PUBLICATIONS

Organometallics (month unavailable) 1995, vol. 14, pp. 789–795, Okuda et al, Synthesis and Characterization of Zirconium Complexes Containing a Linked Amido–Fluorenyl Ligand.

J. Am. Chem. Soc., (month unavailable) 1995, 117, pp. 6414–6415, Johnson et al, New PD(II)–and Ni(II)–Based Catalysts for Polymerization of Ethylene and a–Olefins.

Z Naturforsch B, (month unavailable) 1973, 33 pp. 1381–1385. Dieck et al, Diazadien–Nickel–Komplexe, I: Bis(diazadien)–nickel(O) und Bromo–diazadien–nickel(I).

Angew. Chem. Indt. Ed. Engl. 24, (month unavailable) 1985, No. 7, pp. 599–601, Starzewski et al, Highly Active Ylide–Nickel Catalysts for the Polymerization of Ethylene.

Journal of Organomettalic Chemistry, 369, (month unavailable) 1989, pp. 359–370, Wiesenfeldt et al, XVII*. Racemic and meso diastereomers of group IV metallocene derivatives with symmetrically substituted, dimethylsilanediyl–bridge ligand frameworks. Crystal structure of R,S–Me$_2$Si(3–t–Bu–5–MeC$_5$H$_2$)$_2$ZrCl$_2$ No date available.

Journal of Colloid & Interface Science, vol 78, No. 1, Nov. 1980, pp. 31–36, McDaniel et al, Total Porosity of High-Pore–Volume Silicas by Liquid Adsorption.

Applied Optics, Feb. 1972, vol. 11, No. 2, p. 265, J. Cornillault, Particle Size Analyzer.

W. Kaminsky et al, in J. Macromol. Sci., Rev. Macromol. Chem. Phys. (month unavailable) 1997, C37, 519–554, Group 4 Metallocenes: Supported and Unsupported.

P.R. Rony, Chemical Engineering Science, (month unavailable) 1968, vol. 23, pp. 1021–1034, Supported liquid–phase catalysts.

Brunauer et al, J. Anorg. Chem. Soc. Feb. 1938, 60, pp. 309–319, Adsorption of Gases in Multimoleuclar Layers.

* cited by examiner

Primary Examiner—Mark L. Bell
Assistant Examiner—J. Pasterczyk
(74) Attorney, Agent, or Firm—Joseph C. Gil; Noland J. Cheung

(57) ABSTRACT

The invention relates to a process for the preparation of supported polymerization catalyst systems comprising the steps of:

a) dissolving at least one different transition metal complex in a mixture of at least two different solvents having different boiling points to form a solution, b) contacting said solution with at least one different support material, the volume of the solution being sufficient to form a slurry with the support material, the volume of the higher-boiling solvent being less than or equal to the total pore volume of the support, c) removing more than 90% of the solvent boiling at the lower temperature, and d) adding at least one co-catalyst.

12 Claims, No Drawings

PROCESS FOR THE PREPARATION OF SUPPORTED POLYMERIZATION CATALYST SYSTEMS AND USE THEREOF IN THE HOMO-AND CO-POLYMERIZATION OF UNSATURATED MONOMERS

FIELD OF THE INVENTION

The invention relates to a process for the preparation of supported polymerization catalyst systems comprising the steps of: a) dissolving at least one different transition metal complex in a mixture of at least two different solvents having different boiling points to form a solution, b) contacting said solution with at least one different support material, the volume of the solution being sufficient to form a slurry with the support material(s), the volume of the higher-boiling solvent being less than or equal to the total pore volume of the support, and c) removing more than 90% of the solvent boiling at the lower temperature, wherein at least one co-catalyst is added, to the supported polymerization catalysts which can be prepared by means of that process, and to the use thereof in processes for the homo- or co-polymerization of unsaturated monomers.

BACKGROUND OF THE INVENTION

Catalyst systems which catalyze the homo- or co-polymerization of unsaturated monomers have in the past gained great importance. The essential constituents of those catalyst systems (single site catalysts) are a transition metal complex as the active catalyst component and a co-catalyst component, preferably an alkylaluminoxane or the salt of a non-coordinating anion. As the transition metal component, preferably π-complexes of groups 3 to 8 of the periodic system of the elements, especially (substituted) cyclopentadienyl complexes of group 4, as well as diazadiene derivatives of group 8, especially of nickel and palladium are used. Methylaluminoxane or (substituted) tetraaryl borates are preferably used as the co-catalyst component. Unsaturated monomers are preferably ethene, $\alpha$-olefins, diolefins, vinyl or acrylic compounds, especially vinyl acetate, methyl methacrylate or acrylonitrile. Such systems, in contrast to the conventional Ziegler-Natta systems which are widely used, as well as being highly active and highly productive, also allow the product properties to be controlled in a specific manner in dependence on the components and reaction conditions used and make it possible to obtain novel polymer structures having very promising properties with regard to their commercial application.

A large number of publications relating to the preparation of specific polymers using the mentioned catalyst systems are known from the literature. In EP-B-129,368, for example, catalyst systems are described consisting of (substituted) cyclopentadienyl metal complexes with metals of groups 4 to 6 and methylaluminoxane, which permit the polymerization of olefins. Another catalyst system for the polymerization of olefins and acrylate monomers is disclosed in WO 96/23010, which describes the preparation of polyolefins using diazadiene complexes with metals of groups 4 to 8. The subject of EP-A-420,436 is hetero atom-substituted, bridged monocyclopentadienyl complexes with metals of group 4, which, by combination with aluminoxanes, catalyze the polymerization of olefins. EP-B-509,294 describes the homo- and co-polymerization of $\alpha$-olefins with the aid of a catalyst system consisting of (substituted) monocyclopentadienyl complexes of chromium and non-coordinating anions.

Under polymerization conditions, the described catalyst systems produce polymers which are generally insoluble in the reaction medium. The (homogeneous) catalyst systems, which are soluble in the reaction medium, therefore form polymer deposits on the walls of the reactor, which make thermal control of the reaction difficult. A further disadvantage is that they are generally not suitable for controlling the morphology of the polymer particles.

The described disadvantages can be avoided by applying the above-mentioned active polymerization catalyst systems to support materials which are or have been rendered inert, such systems, thus, being rendered heterogeneous. Such supported catalyst systems have the advantage that they can be used in gas-phase processes and it is furthermore possible to specify the mentioned morphology of the polymer particles directly by the particle shape of the support. Furthermore, catalyst systems which have been rendered heterogeneous generally achieve their maximum activity at lower co-catalyst/catalyst ratios than when used in homogeneous form, as is shown, for example, by W. Kaminsky, et al. in *J. Macromol. Sci., Rev. Macromol Chem. Phys.* 1997, C37, 519–554.

Several possible methods of fixing polymerization catalyst systems, especially metallocenes, to supports are known. EP-A-206,794 describes heterogeneous catalyst systems obtained by adding the metallocene catalyst and the aluminoxane co-catalyst simultaneously or in succession to an inorganic support material. EP-B-323,716 and EP-B-367,503 describe the preparation of a heterogeneous catalyst system consisting of a metallocene catalyst and an aluminoxane co-catalyst, in which the aluminoxane component is formed in situ by reaction of a trialkylaluminium derivative with undehydrated silica gel and the active catalyst system is obtained by the subsequent addition of the metallocene component. EP-A-474,391 and EP-A-314,797, on the other hand, disclose heterogeneous catalyst systems characterized by the prior formation of the fixed co-catalyst component by reaction of an organoaluminum compound with the hydroxyl groups of the support material.

WO 96/00243 describes the supporting of metallocene catalysts and aluminoxane co-catalysts on porous support materials, wherein a solution of the metallocene and of the aluminoxane is formed and is brought into contact with the support material, and wherein the volume of the catalyst solution corresponds to from one to three times the pore volume of the support material used, so that the volume of the catalyst solution is not sufficient to form a slurry. WO 96/00245 describes supported catalyst systems which are prepared by bringing a metallocene and co-catalyst solution into contact with a porous support material, wherein the total volume of the metallocene and co-catalyst solution is less than the volume to form a slurry but at least greater than the pore volume of the support material used, and wherein, furthermore, methods in which the total volume of the metallocene and co-catalyst solution is less than the pore volume of the support material used are expressly excluded. Furthermore, in WO 96/14155, a process is described for supporting catalyst systems wherein the porous support is impregnated with an aluminoxane solution or a metallocene-aluminoxane solution and wherein the volume of that solution is less than twice the total pore volume of the support, less than the volume required to form a slurry or suspension and, moreover, greater than or equal to the total pore volume of the support. The methods described in WO 96/00243, WO 96/00245 and WO 96/14155 have the disadvantage that the supported catalysts prepared in accordance with that teaching are not obtained in the form of free-flowing powders, which is disadvantageous in commercial processes.

U.S. Pat. No. 5,688,734 describes a process for the preparation of prepolymerized supported catalyst systems which are obtained by first impregnating a porous support with the reaction product of metallocene and aluminoxane in hydrocarbon solvents, then drying the reaction product and subsequently adding aliphatic hydrocarbon solvents, and which are used for prepolymerization with gaseous monomers. The volume of the metallocene-aluminoxane-hydrocarbon mixture is to be less than or equal to the total pore volume of the system. Disadvantages of that process are the comparatively large number of process steps required to obtain the usable prepolymerized catalyst system, and the fact that the ionic catalyst system produced on the support is in heterogeneous form on account of its poor solubility in the aliphatic hydrocarbons.

In summary, all the immobilization methods described in the prior art satisfy the requirements made of an industrially usable catalyst system with regard to control of particle morphology and ready separability, but they are characterized by poorer activity in comparison with homogeneous systems or by the fact that, as mentioned, they cannot be used in the form of free-flowing powders in suitable processes.

SUMMARY OF THE INVENTION

The object of the present invention is to combine the advantages of an industrially and economically preferred, heterogeneous procedure with the simultaneously desired high activity of a homogeneous catalyst system, the catalyst system being in the form of free-flowing particles.

Accordingly, the present invention relates to a process for the preparation of supported polymerization catalyst systems, comprising the steps of:

a) dissolving at least one different transition metal complex in a mixture of at least two different solvents having different boiling points to form a solution, b) contacting said solution with at least one different support material, the volume of the solution being sufficient to form a slurry with the support material, the volume of the higher-boiling solvent being less than or equal to the total pore volume of the support, c) removing more than 90% of the solvent boiling at the lower temperature, and d) adding at least one co-catalyst is added.

DETAILED DESCRIPTION OF THE INVENTION

Surprisingly, it has been found that the model of supported liquid-phase catalysts known from the literature (P. R. Rony, *Chem. Eng. Sci.* 1968, 23, 1021–1034) can also be applied to polymerization catalyst systems, that such catalyst systems have a high activity and productivity even where the proportion of co-catalyst component is reduced, and that this concept is also applicable to multi-component systems.

Supported liquid-phase polymerization catalyst systems are distinguished by a high degree of variability of the catalyst constituents that can be used and of the monomers. They consist of a liquid, high-boiling phase which is dispersed in a porous support material and in which the constituents of the catalyst are present in dissolved form. In order to achieve high activities and produce free-flowing powders it is essential that the volume of the liquid phase does not exceed the pore volume of the support that is used. Other advantages are that the concentration of the monomers when the catalyst is used in gas-phase processes in the immediate vicinity of the active catalyst component is markedly higher on account of the solubility of most monomers in the dispersed liquid phase, and that separation of the catalyst system, which in most cases is present in ionic form, by salvation of the ion pair is possible. The widening of the distance between the constituents of the ion pair is generally held responsible for its higher activity.

The present invention relates also to supported polymerization catalyst systems which can be prepared by the process according to the present invention, to the use thereof in the homo- and co-polymerization of mono- or poly-unsaturated monomers in gas-phase and slurry processes, and to the polymers which can be prepared with the supported polymerization catalyst systems according to the present invention.

The process according to the present invention is based especially on a method of preparing a supported polymerization catalyst system in which a solvent mixture containing the dissolved catalyst system components is brought into contact with a porous support material, wherein the solvent mixture consists of at least two solvents which have markedly different boiling points, wherein, furthermore, the volume of the higher-boiling solvent is less than the pore volume of the support material used, wherein the higher-boiling solvent remains on the porous support material and contains the catalyst system components in dissolved form, and the lower-boiling solvent is removed by distillation.

Preferably before, during and, optionally, after application of the catalyst system components, the solids suspension is agitated, for example in a stirrer vessel having a conventional stirring apparatus, such as, for example, a cross-arm agitator or a helical stirrer, or, in a further preferred form, having a plough-blade mixer. Impregnation of the support material with catalyst system solution may preferably also be carried out in a fluidized bed. In that case, the active substance solution is applied to the support material, which is fluidized by means of a stream of inert gas, by, for example, atomization by means of a nozzle. After being freed of solvent carried along with it, the inert gas can be fed back into the reactor via an internal circuit. The inert, lower-boiling solvent can be re-used for preparing the active substance solution. The process according to the present invention may also be carried out continuously. Furthermore, it is possible to control the level of activity of the catalyst system by adjusting the ratio of the amounts of catalyst system components metered in.

The preparation of the supported catalyst system can be carried out in a wide temperature range. In general, the temperature lies between the melting point and the boiling point of the inert solvent mixture. The process is usually carried out at temperatures of from −50 to +200° C., preferably from −20 to 100° C., especially from 20 to 60° C.

Following impregnation of the support material with active substance solution, the lower-boiling, inert solvent(s) is/are removed by distillation to such an extent that the volume of the higher-boiling solvent(s) that remain(s) is less than or equal to the pore volume of the support material used. Preferably more than 90% of the lower-boiling solvent is removed.

The distillation may take place either in the same container in which the impregnation was carried out or in a separate apparatus, for example, a fluidized bed dryer. On removal of the solvent(s), the admission of air and moisture must be avoided. According to the solvent used, the distillation is carried out at temperatures of from 0 to 150° C., preferably from 10 to 70° C., and at pressures of from 0.001 mbar to 20 bar absolute, preferably from 0.001 mbar to normal pressure. The distillation may also be carried out continuously. The condensate collected under inert conditions can be used again, without further working up, as the solvent component for the active substances employed in the impregnation.

Any porous support materials which are dimensionally stable in the solvents or solvent mixtures used and which have a sufficiently high pore volume, which can easily be determined by means of preliminary tests with reference to the object to be achieved are suitable for the process according to the present invention. The support materials used are preferably particulate, organic or inorganic solids whose pore volume is from 0.1 to 15 ml/g, preferably from 0.25 to 5 ml/g, whose specific surface is greater than 1, preferably from 10 to 1000 m$^2$/g (BET), and whose particle size is from 10 to 2500 µm, preferably from 50 to 1000 µm, and which can be suitably modified at their surface.

The specific surface is determined in the usual manner according to Brunauer, Emmet and Teller, *J. Anorg. Chem. Soc.* 1938, 60, 309, the pore volume by the centrifugation method according to McDaniel, *J. Colloid Interface Sci.* 1980, 78, 31, and the particle size according to Cornillaut, *Appl. Opt.* 1972, 11, 265.

As suitable inorganic solids, there may be mentioned by way of examples, but without limiting the present invention: silica gels, precipitated silicas, clays, alumosilicates, talcum, zeolites, carbon black, inorganic oxides, such as, for example, silicon dioxide, aluminum oxide, magnesium oxide, titanium dioxide, inorganic chlorides, such as, for example, magnesium chloride, sodium chloride, lithium chloride, calcium chloride, zinc chloride, or calcium carbonate. The mentioned inorganic solids, which meet the above-mentioned specification and, therefore, are especially suitable for use as support materials, are described in greater detail in, for example, Ullmanns Enzyklopädie der technischen Chemie, Vol. 21, p. 439 ff (silica gels), Vol. 23, p. 311 ff (clays), Vol. 14, p. 633 ff (carbon blacks) and Vol. 24, p. 575 ff (zeolites).

Suitable organic solids powdered polymeric materials are preferably in the form of free-flowing powders, having the above-mentioned properties. Examples, without limiting the present invention, are: polyolefins, such as, for example, polyethene, polypropene, polystyrene, polystyrene-co-divinylbenzene, polybutadiene, polyethers, such as, for example, polyethylene oxide, polyoxytetra-methylene or polysulfides, such as, for example, poly-p-phenylene sulfide. Especially suitable materials are polypropylene, polystyrene or polystyrene-co-divinylbenzene. The mentioned organic solids, which meet the above-mentioned specification and therefore are especially suitable for use as support materials, are described in greater detail in, for example, Ullmanns Enzyklopädie der technischen Chemie, Vol. 19, p. 195 ff (polypropylene) and Vol. 19, p. 265 ff (polystyrene).

As active polymerization components, polymerization catalyst systems may be used which are suitable in homogeneous phase for the polymerization of unsaturated monomers. Without limiting the present invention, special preference is given to such catalyst systems that contain as active constituents:

A) a transition metal complex according to the general formula I, II, III or IV

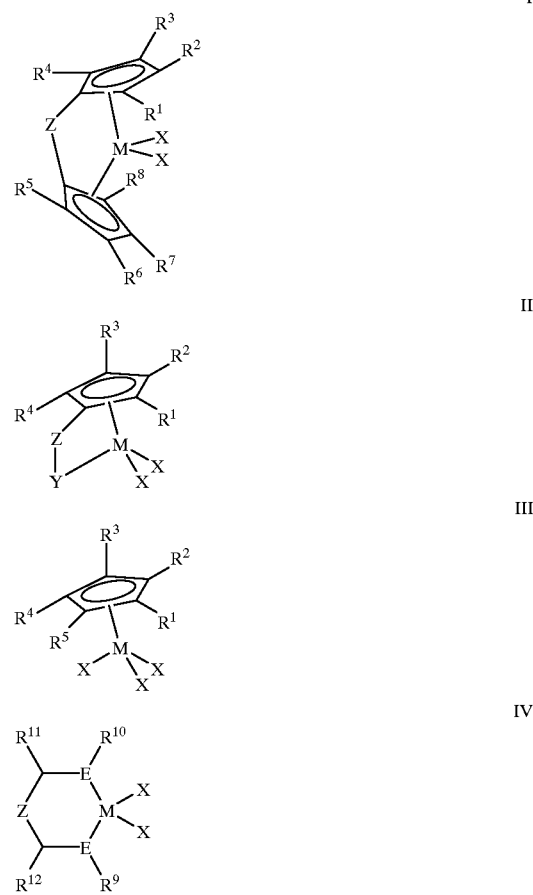

and

B) a compound forming a transition metal complex cation.

In formulae I to IV, the substituents have the following meanings:

M represents transition metals of groups 3 to 8 of the periodic system of the elements, preferably titanium, zirconium, hafnium, vanadium, chromium, tungsten, iron, ruthenium, cobalt, nickel and palladium.

X is a mono-anionic or non-anionic ligand selected from halide, hydride, $C_1$- to $C_{10}$-alkyl or -alkenyl, $C_6$- to $C_{14}$-aryl, alkylaryl having a $C_1$ to $C_{10}$ grouping in the alkyl moiety and a $C_6$ to $C_{20}$ grouping in the aryl moiety, —$OR^{13}$, $OR^{13}R^{14}$, —$NR^{15}R^{16}$, $NR^{15}R^{16}R^{17}$, —$PR^{15}R^{16}$, $PR^{15}R^{16}R^{17}$, wherein the substituents X may be identical or different, wherein the two groupings X may also be bridged, and wherein $R^{13}$ to $R^{17}$ may be selected from H, $C_1$- to $C_{18}$-alkyl, $C_5$- to $C_8$-cycloalkyl, $C_6$- to $C_{14}$-aryl, alkylaryl and arylalkyl and may be identical or different.

Y is a mono-anionic or non-anionic ligand which is bonded covalently or coordinately to M and Z and which contains the elements nitrogen, phosphorus, oxygen, sulfur or boron, preferably the groupings —$NR^{18}$—, —$R^{18}R^{19}$—, —$PR^{18}$—, —$(PR^{18}R^{19})_m$—, —$BR^{20}$—, —$BR^{21}R^{21}$—, —O—, —S—, —$OR^{22}$— or —$(SR^{22})_m$—, wherein $R^{18}$ to $R^{22}$ may be selected from H, $C_1$- to $C_{18}$-alkyl, $C_5$- to $C_8$-cycloalkyl, $C_6$- to $C_{14}$-aryl, alkylaryl, arylalkyl and halogen and may be identical or different, and m is an integer from 1 to 8.

Z represents a covalent or coordinate bridging unit, especially $-(CR^{23}R^{24})_m-$, $-(SiR^{25}R^{26})_m$, $-(CR^{23}R^{24}SiR^{25}R^{26})_m-$, $-(CR^{23}R^{24}O)_mCR^{23}R^{24}-$, $-(SiR^{25}R^{26}O)_mSiR^{25}R^{26}-$, $-NR^{27}-$, $-NR^{27}R^{28}-$, $-PR^{27}-$, $-(PR^{27}R^{28})_m-$, $-BR^{29}-$, $-BR^{29}R^{30}-$, $-O-$, $-S_m-$, $-OR^{23}-$, $-(SR^{23})_m-$, $-B(R^{29}R^{30})P(R^{27}R^{28})-$ or $-B(R^{29}R^{30})N(R^{27}R^{28})-$, wherein $R^{23}$ to $R^{30}$ may be selected from H, $C_1$- to $C_{18}$-alkyl, $C_5$- to $C_8$-cycloalkyl, $C_6$- to $C_{14}$-aryl, alkylaryl, arylalkyl and halogen and wherein $R^{21}$ to $R^{27}$ may be identical or different, and m is an integer from 1 to 8. Z may also be part of a ring system.

E represents elements of groups 15 and 16 of the periodic system of the elements, especially nitrogen, phosphorus or oxygen, and groupings that contain elements of groups 15 and 16 of the periodic system of the elements. E may also be part of a ring system.

$R^1$ to $R^8$ represent H, $C_1$- to $C_{18}$-alkyl, $C_5$- to $C_8$-cycloalkyl which in turn may carry $C_1$- to $C_8$-alkyl groups, $C_6$- to $C_{14}$-aryl, alkylaryl, arylalkyl, wherein two adjacent radicals together may form $C_3$ to $C_{14}$ cyclic compounds, or represent $-(CR^{13}R^{14})_mSiR^{31}R^{32}R^{33}$, $-CR^{13}R^{14})_mNR^{34}R^{35}$, $-(CR^{13}R^{14})_mPR^{34}R^{35}$, $-SiR^{31}R^{32}R^{33}$, $-NR^{34}R^{35}$, $-PR^{34}R^{35}$, $-BR^{36}R^{37}$ or halogen, wherein $R^1$ to $R^8$ may be identical or different, and wherein $R^{31}$ to $R^{37}$ may be selected from the group H, $C_1$- to $C_{18}$-alkyl, $C_5$- to $C_8$-cycloalkyl, $C_6$- to $C_{14}$-aryl, alkylaryl, arylalkyl and halogen and may be identical or different, wherein $R^{13}$ and $R^{14}$ have the meaning defined and m is an integer from 1 to 8.

$R^9$ to $R^{12}$ represent H, $C_1$- to $C_{18}$-alkyl, $C_5$- to $C_8$-cycloalkyl which in turn may carry $C_1$- to $C_8$-alkyl groups, $C_6$- to $C_{14}$-aryl which in turn may carry $C_1$- to $C_8$-unbranched and branched alkyl groups, alkylaryl, arylalkyl, wherein $R^{11}$ and $R^{12}$ together may form $C_5$ to $C_{14}$ cyclic compounds or heterocyclic compounds containing especially the elements silicon, phosphorus, oxygen and sulfur, and wherein $R^9$ to $R^{12}$ may be identical or different.

The complexes of the general formulae I to IV and processes for their preparation are known per se and described, for example, in *J. Organomet.* 1989, 369, 359–370, in *Organometallics* 1995, 14, 789–795, in EP-A-420,436, in EP-A-416,815, in *J. Am. Chem. Soc.* 1995, 117, 6414–6415, in WO 96/23010, in *Z. Naturforsch. B* 1978, 33, 1381–1385, and in *Angew. Chem. Int. Ed. Engl.* 1985, 24, 599–601.

There may be used as the compound B) forming a transition metal complex cation, for example, open-chain or cyclic aluminoxane compounds which correspond to the general formula V or VI

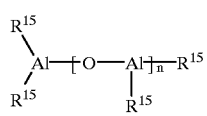

V

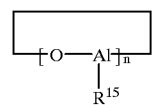

VI wherein
$R^{15}$ represents a $C_1$- to $C_8$-alkyl group, preferably a methyl or ethyl group, and n represents an integer from 3 to 30, preferably from 10 to 25.

The preparation of those oligomeric aluminoxane compounds is usually carried out by reacting a trialkylaluminium solution with water and is described, inter alia, in EP-A-284,708. In general, the oligomeric aluminoxane compounds obtained in that manner are in the form of mixtures of both linear and cyclic molecules of different lengths, so that n is to be regarded as an average value. Those aluminoxane compounds may also be present in admixture with other metal alkyls, preferably with aluminum alkyls.

It has proved advantageous to use the transition metal component and the oligomeric aluminoxane compound in such amounts that the molar ratio of aluminum from the aluminoxane component to transition metal from the transition metal component is in the range of from 1:1 to 20,000:1, especially in the range of from 10:1 to 1,000:1.

However, it is possible to use as the compound B) forming a transition metal complex cation also coordination complex compounds selected from the group of the strong, neutral Lewis acids, the ionic compounds with Lewis acid cations or Brönsted acid cations and non-coordinating anions.

Preferred strong neutral Lewis acids are compounds of the general formula VII

VII wherein
$M^2$ represents an element of group 3, especially B, Al or Ga, preferably B, $X^1$, $X^2$ and $X^3$ represent H, $C_1$- to $C_{10}$-alkyl, $C_1$- to $C_{14}$-cycloalkyl, $C_6$- to $C_{14}$-aryl, alkylaryl, arylalkyl, haloalkyl, haloaryl, haloalkylaryl or haloarylalkyl having $C_1$- to $C_{10}$-alkyl, $C_1$- to $C_{14}$-cycloalkyl and $C_6$- to $C_{20}$-aryl radicals or/and fluorine, chlorine, bromine or iodine, especially haloaryls, preferably perfluorosubstituted.

Within the context of the invention it is, however, especially preferred to use compounds of the general formula VII wherein $X^1$, $X^2$ and $X^3$ are identical, preferably tris (pentafluorophenyl)borane. Those compounds and processes for their preparation are known per se and described, inter alia, in WO 93/03067.

Suitable ionic compounds with Lewis or Brönsted acid cations and non-coordinating anions are compounds of the general formula VIII

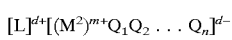

VIII wherein
L represents a Lewis acid cation according to the Lewis acid/base theory, preferably carbonium, oxonium or/and sulfonium cations as well as cationic transition metal complexes, preferably triphenylmethyl cation, silver cation or ferrocenyl cation, or L represents a Brönsted acid cation according to the Brönsted acid/base theory, preferably trialkylammonium, dialkylarylammonium or/and alkyldiarylammonium, preferably N,N-dimethylanilinium, $M^2$ represents an element of group 3, especially B, Al or Ga, preferably B, $Q_1$ to $Q_n$ represent singly negatively charged radicals, such as hydride, $C_1$- to $C_{28}$-alkyl, $C_1$- to $C_{14}$-cycloalkyl, $C_6$- to $C_{14}$-aryl, alkylaryl, arylalkyl, haloalkyl, haloaryl, haloalkylaryl or haloarylalkyl having $C_1$- to $C_{28}$-alkyl, $C_1$- to $C_{14}$-cycloalkyl and $C_6$- to $C_{14}$-aryl radicals, or halogen, alkoxide, aryl oxide or organometalloid, and $Q_1$ to $Q_n$ are identical or different, d represents an integer from 1 to 6 and d=n−m, n represents an integer from 2 to 8, and m represents an integer from 1 to 7.

Preferred anions $[(M^2)^{m+}Q_1Q_2 \ldots Q_n]^{d-}$ of the general formula VIII are those in which $Q_1$ to $Q_n$ are bulky, perfluorosubstituted, aromatic hydrocarbon radicals and $M^2$ is boron or aluminum, especially tetrakis (pentafluorophenyl)borate.

It is, of course, also possible to use mixtures of different active polymerization transition metal complexes and mixtures of different co-catalyst components.

Solvents, which may be used are any solvents in which the mentioned polymerization catalyst systems are soluble and which are inert towards the components of the catalyst system. Suitable solvents are aromatic hydrocarbons, preferably benzene and substituted benzene derivatives, especially toluene, xylene, diisopropylbenzene, butylbenzene, hexylbenzene, dodecylbenzene, or 1,2,3,4-tetrahydronaphthalene, aliphatic hydrocarbons, preferably acyclic hydrocarbons, especially pentane, hexane, heptane, octane, nonane, decane, dodecane, tetradecane, hexadecane or eicosane, or preferably cyclic hydrocarbons, especially cyclohexane, methylcyclohexane or decahydronaphthalene.

As the higher-boiling solvent component, any high-boiling solvent is suitable whose boiling point is greater than 150° C. at room temperature and normal pressure and in which the mentioned polymerization catalyst systems are soluble and which are inert towards the components of the catalyst system. Without limiting the present invention, especially suitable are aromatic hydrocarbons, preferably substituted benzene derivatives, especially cumene, propylbenzene, butylbenzene, hexyl-benzene, dodecylbenzene, 1,3-diisopropylbenzene, 1,4-diisopropylbenzene or 1,2,3,4-tetrahydronaphthalene, aliphatic hydrocarbons or, preferably, acyclic hydrocarbons, especially decane, dodecane, tetradecane, hexadecane or eicosane, or cyclic hydrocarbons, especially cyclodecane or decahydronaphthalene.

The invention relates also to the use of the supported polymerization catalysts prepared according to the present invention in a process for the homo- or co-polymerization of mono- or poly-unsaturated monomers in slurry processes and in the gas phase.

Without limiting the present invention, suitable unsaturated monomers are preferably ethene; α-olefins, such as propene, isobutene, 1-butene, 1-hexene or 1-octene; cyclic olefins, such as norbornene or cyclopentene; vinyl aromatic compounds, such as styrene or 4-methylstyrene; or dienes, such as ethylidenenorbornene, vinyl-norbornene, 1,5-hexadiene, 2-methyl-1,7-octadiene, norbornadiene, 1,3-cyclopentadiene, 1,3-butadiene or isoprene; substituted olefins, preferably acrylic acid esters, methacrylic acid esters; and carbon monoxide.

The polymerization is preferably carried out by bringing the mono- or poly-unsaturated monomers into contact with the described supported catalyst system prepared according to the present invention in gaseous form, in liquid form finely divided or suspended in liquid diluents. Other gases or finely divided liquids which serve either for dilution, for atomization or for the removal of heat may be mixed with the gaseous or atomized monomers,.

The polymerization can be carried out at pressures of from 0.001 bar to 1000 bar, preferably from 0.1 to 100 bar, especially from 1 to 20 bar. In general, the polymerization is carried out at temperatures of from −20 to 250° C., preferably at from 0 to 200° C., especially at from 20 to 160° C.

The polymers obtainable by the use of the inventive catalysts are useful for the production of all kinds of shaped articles, preferably O-rings, profiles, seals, membranes and foils.

The Examples which follow are intended to illustrate the present invention for preparing supported polymerization-initiating systems, and the implementation of homo- and co-polymerization processes catalyzed thereby, without, however, limiting the invention to the Examples.

EXAMPLES

All reactions were carried out with the strict exclusion of air and moisture, using the Schlenk and high-vacuum technique. The solvents used were dry, saturated with purified nitrogen and stored under a nitrogen atmosphere.

rac-[Ethylene-1,2-bis(4,5,6 ,7-tetrahydro-1-indenyl)] zirconium dichloride (EBTHlZrCl$_2$) was obtained as a commercial product from Witco (Germany). [1,4-Bis-(2,6-diisopropylphenyl)-1,4-diaza-1,3-butadiene]nickel dibromide (DADNiBr$_2$) was prepared in the manner described by H. Tom Dieck and M. Svoboda in *Z. Naturforsch.* B 1978, 33, 1381. Triethylaluminium and methylaluminoxane in a 10wt. % solution in toluene (Eurecen AL 5100/10T) were used in the form of commercial products from Witco (Germany). Dimethylanilinium tetrakis (pentafluorophenyl)borate (DAB) and tris (pentafluorophenyl)borane (TPB) were used in the form of commercial products from Albemarle Corp., USA. Pre-treated silica (Sylopol 2104; commercial product from Grace, USA) and methylaluminoxane-modified silica (TA 02794/HL, commercial product from Witco, Germany) were used as supports.

The polymerizations were carried out in a 2.5 liter steel reactor equipped with a helical stirrer, which is suitable for polymerization in a fixed bed. It was possible to monitor the reaction in the reactor by means of automatic data acquisition. The inert and anhydrous starting bed (200 g of PE powder) was introduced into the reactor, which had previously been thoroughly heated and rendered inert with nitrogen, by way of a transfer tube in the nitrogen counter-current. At a stirrer speed of 200 rpm, the reactor was heated to 50° C. and then the given amount of catalyst was pressed into the reactor with nitrogen via the transfer tube, and the composition of the gas phase was then adjusted:

Gas-phase adjustment for polyethylene (PE) polymerization: total pressure: 6.0 bar; partial pressures: 0.8 bar nitrogen; 5.2 bar ethene. Gas-phase adjustment for EP(D)M procedure: total pressure: 6.0 bar; partial pressures: 0.8 bar nitrogen; 1.2 bar propene; 4.0 bar ethene.

In dependence on the total reactor pressure, the consumed monomer was automatically replaced in the course of the reaction. The reaction was terminated by relieving the pressure in the reactor and flushing with nitrogen. In the tests to prepare EPDM, the termonomer ethylidenenorbornene (ENB) (Inspec, Belgium) was metered in manually during the reaction from a burette, in dependence on the amount of polymer formed.

The composition of the resulting EP(D)M polymers was determined by IR analysis in accordance with the usual ASTM D3900 standard.

Example 1

Pre-treatment of Silica 200.0 g of silica (Sylopol 2104; surface 311 m$^2$/g; pore volume 1.56 mug; particle size (D50) 51 μm) are heated for 32 hours in a rotary furnace at 450° C. under a protecting gas, and drawn off. The silica so pre-dried is suspended in 1200 ml of n-hexane in a 4 liter three-necked flask under a nitrogen atmosphere, and a 20 wt. % solution of Triethyla-luminium in hexane is added dropwise thereto in the course of 90 minutes. During the addition, the temperature is to be maintained at from 15 to 20° C. When the addition is complete, stirring is carried out for a further 60 minutes at that temperature and the suspension is filtered over a P4 frit. The product is washed five times with portions of 100 ml of n-hexane and dried under a high vacuum at 20° C. until constant weight is reached. The aluminum content of the silica gel pre-treated in this manner is 3.1 wt. %; 203.6 g of product (TEA-SiO$_2$) were obtained.

Methylaluminoxane-modified silica (MAO-SiO$_2$) was used without further pre-treatment and has a specific surface according to BET of 305 m$^2$/g, a pore volume of 2.0 ml/g and an average particle size of 80 μm; the aluminum content is 24.5 wt. %.

Example 2
Preparation of Catalyst 1 (EBTHIZrCl$_2$/MAO/butylbenzene/MAO-SiO$_2$)

A solution of 0.163 g of EBTHIZrCl$_2$ and 66.4 ml of a 10 wt. % MAO solution in toluene in 82.5 ml of toluene and 14.8 ml of butylbenzene is slowly added dropwise, with stirring, to 14.8 g of MAO-SiO$_2$. The resulting suspension is stirred for 60 minutes at 20° C., and the toluene is distilled off at 20° C. under a high vacuum. The resulting distillate had a butylbenzene content of 4.0 vol. %. A slightly yellow, free-flowing powder was obtained, which contained 11 μmol of zirconium component per g of catalyst material and had an aluminum-zirconium ratio of 640:1.

Example 3
Preparation of Catalyst 2 (EBTHIZrCl$_2$/MAO/1,4-diisopropylbenzene/MAO-SiO$_2$)

A solution of 0.163 g of EBTHIZrCl$_2$ and 67.5 ml of a 10 wt. % MAO solution in toluene in 82.5 ml of toluene and 15.0 ml of 1,4-diisopropylbenzene is slowly added dropwise, with stirring, to 15.0 g of MAO-SiO$_2$. The resulting suspension is stirred for 60 minutes at 20° C., and the toluene is distilled off at 20° C. under a high vacuum. The resulting distillate had a 1,4-diisopropylbenzene content of 0.6 vol. %. A light-yellow, free-flowing powder was obtained, which contained 11 μmol of Zr component per g of catalyst material and had an Al—Zr ratio of 630:1.

Example 4
Preparation of Catalyst 3 (EBTHIZrCl$_2$/MAO/hexylbenzene/MAO-SiO$_2$)

A solution of 0.163 g of EBTHIZrCl$_2$ and 66.2 ml of a 10 wt. % MAO solution in toluene in 80.9 ml of toluene and 14.7 ml of hexylbenzene is slowly added dropwise, with stirring, to 14.7 g of MAO-SiO$_2$. The resulting suspension is stirred for 60 minutes at 20° C., and the toluene is distilled off at 20° C. under a high vacuum. The resulting distillate had a hexylbenzene content of 0.4 vol. %. A yellow, slightly agglomerated powder was obtained, which contained 11 μmol of Zr component per g of catalyst material and had an Al—Zr ratio of 630:1.

Example 5
Preparation of Catalyst 4 (EBTHIZrCl$_2$/MAO/dodecylbenzene/MAO-SiO$_2$)

A solution of 0.163 g of EBTHIZrCl$_2$ and 113.9 ml of a 10 wt. % MAO solution in toluene in 139.2 ml of toluene and 25.3 ml of dodecylbenzene is slowly added dropwise, with stirring, to 25.3 g of MAO-SiO$_2$. The resulting suspension is stirred for 60 minutes at 20° C., and the toluene is distilled off at 20° C. under a high vacuum. No dodecylbenzene could be detected in the resulting distillate. A light-greenish, free-flowing powder was obtained, which contained 11 μmol of Zr component per g of catalyst material and had an Al—Zr ratio of 630:1.

Example 6
Preparation of Catalyst 5 (EBTHIZrCl$_2$/MAO/tetrahydronaphthalene/MAO-SiO$_2$)

A solution of 0.207 g of EBTHIZrCl$_2$ and 86.2 ml of a 10 wt. % MAO solution in toluene in 105.3 ml of toluene and 19.2 ml of 1,2,3,4-tetrahydronaphthalene is slowly added dropwise, with stirring, to 19.2 g of MAO-SiO$_2$. The resulting suspension is stirred for 60 minutes at 20° C., and the toluene is distilled off at 20° C. under a high vacuum. The resulting distillate had a tetrahydronaphthalene content of 1.8 vol. %. A yellowish, slightly agglomerated powder was obtained, which contained 10.5 μmol of Zr component per g of catalyst material and had an Al—Zr ratio of 630:1.

Example 7
Preparation of Catalyst 6 (EBTHIZrCl$_2$/MAO/decahydronaphthalene/MAO-SiO$_2$)

A solution of 0.215 g of EBTHIZrCl$_2$ and 87.3 ml of a 10 wt. % MAO solution in toluene in 106.7 ml of toluene and 19.4 ml of decahydronaphthalene is slowly added dropwise, with stirring, to 19.4 g of MAO-SiO$_2$. The resulting suspension is stirred for 60 minutes at 20° C., and the toluene is distilled off at 20° C. under a high vacuum. The resulting distillate had a decahydronaphthalene content of 4.2 vol. %. A slightly yellow, slightly agglomerated powder was obtained, which contained 11.5 μmol of Zr component per g of catalyst material and had an Al—Zr ratio of 615:1.

Example 8
Preparation of Catalyst 7 (EBTHIZrCl$_2$/butylbenzene/MAO-SiO$_2$)

A solution of 0.214 g of EBTHIZrCl$_2$ in 200.0 ml of toluene and 20.0 ml of butylbenzene is slowly added dropwise, with stirring, to 20.0 g of MAO-SiO$_2$. The resulting suspension is stirred for 60 minutes at 20° C., and the toluene is distilled off at 20° C. under a high vacuum. A yellowish, free-flowing powder was obtained, which contained 13.4 μmol of Zr component per g of catalyst material and had an Al—Zr ratio of 360:1.

Example 9
Preparation of Catalyst 8 (EBTHIZrCl$_2$/1,4-diisopropylbenzene/MAO-SiO$_2$)

A solution of 0.154 g of EBTHIZrCl$_2$ in 144.0 ml of toluene and 14.4 ml of 1,4-diisopropylbenzene is slowly added dropwise, with stirring, to 14.4 g of MAO-SiO$_2$. The resulting suspension is stirred for 60 minutes at 20° C., and the toluene is distilled off at 20° C. under a high vacuum. A pale yellow, slightly agglomerated powder was obtained, which contained 13.5 μmol of Zr component per g of catalyst material and had an Al—Zr ratio of 360:1.

Example 10
Preparation of Catalyst 9 (EBTHIZrCl$_2$/hexylbenzene/MAO-SiO$_2$)

A solution of 0.152 g of EBTHIZrCl$_2$ in 143.0 ml of toluene and 14.3 ml of hexylbenzene is slowly added dropwise, with stirring, to 14.3 g of MAO-SiO$_2$. The resulting suspension is stirred for 60 minutes at 20° C., and the toluene is distilled off at 20° C. under a high vacuum. A yellowish, free-flowing powder was obtained, which contained 13.5 μmol of Zr component per g of catalyst material and had an Al—Zr ratio of 360:1.

Example 11
Preparation of Catalyst 10 (EBTHIZrCl$_2$/tetrahydronaphthalene/MAO-SiO$_2$)

A solution of 0.229 g of EBTHIZrCl$_2$ in 213.0 ml of toluene and 21.3 ml of 1,2,3,4-tetrahydronaphthalene is slowly added dropwise, with stirring, to 21.3 g of MAO-SiO$_2$. The resulting suspension is stirred for 60 minutes at 20° C., and the toluene is distilled off at 20° C. under a high vacuum. A slightly yellow, free-flowing powder was obtained, which contained 13.0 μmol of Zr component per g of catalyst material and had an Al—Zr ratio of 360:1.

Example 12
Preparation of Catalyst 11 (EBTHI ZrCl$_2$/MAO/1,4-iisopropylbenzene/TEA-SiO$_2$)

A solution of 0.276 g of EBTHIZrCl$_2$ and 115.0 ml of a 10 wt. % MAO solution in toluene in 141.0 ml of toluene and 25.6 ml of 1,4-diisopropylbenzene is slowly added dropwise, with stirring, to 25.6 g of TEA-SiO$_2$. The resulting suspension is stirred for 60 minutes at 20° C., and the toluene is distilled off at 20° C. under a high vacuum. A cream-colored, free-flowing powder was obtained, which contained 11 μmol of Zr component per g of catalyst material and had an Al—Zr ratio of 315:1.

Example 13
Preparation of Catalyst 12 (EBTHIZrCl$_2$/1,4-diisopropylbenzene/TEA-SiO$_2$)

A solution of 0.151 g of EBTHIZrCl$_2$ in 140.0 ml of toluene and 14.0 ml of 1,4-diisopropylbenzene is slowly added dropwise, with stirring, to 14.0 g of TEA-SiO$_2$. The resulting suspension is stirred for 60 minutes at 20 20° C., and the toluene is distilled off at 20° C. under a high vacuum. A free-flowing powder was obtained, which contained 13.5 μmol of Zr component per g of catalyst material and had an Al—Zr ratio of 50:1.

Example 14
Preparation of Catalyst 13 (EBTHIZrCl$_2$/DAB/butylbenzene/MAO-SiO$_2$)

0.264 g of EBTHIZrCl$_2$ is dissolved in 122.0 ml of toluene and 24.4 ml of butylbenzene. To that solution, there are added 8.1 ml of a 10 wt. % TEA solution in toluene, and stirring is carried out for 30 minutes at 20° C. 0.755 g of DAB is added and the mixture is stirred for 15 minutes at 20° C. The solution is slowly added dropwise, with stirring, to 24.4 g of MAO-SiO$_2$, the resulting suspension is stirred for 60 minutes at 20° C., and the toluene is distilled off at 20° C. under a high vacuum. A yellow, free-flowing powder was obtained, which contained 12.3 μmol of Zr component per g of catalyst material and had an Al—Zr ratio of 365:1 and a B—Zr ratio of 3:2.

Example 15
Preparation of Catalyst 14 (EBTHIZrCl$_2$/DAB/tetrahydronaphthalene/MAO-SiO$_2$)

0.221 g of EBTHIZrCl$_2$ is dissolved in 102.5 ml of toluene and 20.5 ml of 1,2,3,4-tetrahydronaphthalene. To that solution, there are added 6.8 ml of a 10 wt. % TEA solution in toluene, and stirring is carried out for 30 minutes at 20° C. 0.621 g of DAB is added and the mixture is stirred for 15 minutes at 20° C. The solution is slowly added dropwise, with stirring, to 20.5 g of MAO-SiO$_2$, the resulting suspension is stirred for 60 minutes at 20° C., and the toluene is distilled off at 20° C. under a high vacuum. A free-flowing powder was obtained, which contained 12.3 μmol of Zr component per g of catalyst material and had an Al—Zr ratio of 370:1 and a B—Zr ratio of 3:2.

Example 16
Preparation of Catalyst 15 (EBTHIZrCl$_2$/TPB/butylbenzene/MAO-SiO$_2$)

0.151 g of EBTHIZrCl$_2$ is dissolved in 70.5 ml of toluene and 14.1 ml of butylbenzene. To that solution there are added 4.7 ml of a 10 wt. % TEA solution in toluene, and stirring is carried out for 30 minutes at 20° C. 0.270 g of TPB is added and the mixture is stirred for 15 minutes at 20° C. The solution is slowly added dropwise, with stirring, to 14.1 g of MAO-SiO$_2$, the resulting suspension is stirred for 60 minutes at 20° C., and the toluene is distilled off at 20° C. under a high vacuum. A slightly yellow, free-flowing powder was obtained, which contained 13.1 μmol of Zr component per g of catalyst material and had an Al—Zr ratio of 400:1 and a B—Zr ratio of 3:2.

Example 17
Preparation of Catalyst 16 (DADNiBr$_2$/MAO/tetrahydronaphthalene/MAO-SiO$_2$)

A solution of 0.262 g of DADNiBr$_2$ and 74.7 ml of a 10 wt. % MAO solution in 91.3 ml of toluene and 16.6 ml of 1,2,3,4-tetrahydronaphthalene is slowly added dropwise, with stirring, to 16.6 g of MAO-SiO$_2$. The resulting suspension is stirred for 60 minutes at 20° C., and the toluene is distilled off at 20° C. under a high vacuum. A grey-green, free-flowing powder was obtained, which contained 10.4 μmol of Ni component per g of catalyst material and had an Al—Ni ratio of 630:1.

Example 18
Polymerization of Ethene and Subsequent Copolymerization of Ethene/propene in a Stirred Fixed Bed Reactor Use of the catalyst of Example 2 (EBTHIZrCl$_2$/MAO/butylbenzene/MAO-SiO$_2$); catalyst use: 0.010 mmol Zr; PE polymerization complete after 0.5 hour.

For further information and results see Table I.

Example 19
Polymerization of Ethene and Subsequent Copolymerization of Ethene/propene in a Stirred Fixed Bed Reactor Use of the catalyst of Example 3 (EBTHIZrCl$_2$/MAO/1,4-diisopropylbenzene/MAO-SiO$_2$); catalyst use: 0.014 mmol Zr; PE polymerization complete after 0.5 hour.

For further information and results see Table I.

Example 20
Polymerization of Ethene and Subsequent Terpolymerization of Ethene/propene/ENB in a Stirred Fixed Bed Reactor Use of the catalyst of Example 3 (EBTHIZrCl$_2$/MAO/1,4-diisopropylbenzene/MAO-SiO$_2$); catalyst use: 0.024 mmol Zr; PE polymerization complete after 0.5 hour; 8.5 wt. % ENB metered in.

For further information and results see Table I.

Example 21
Polymerization of Ethene and Subsequent Copolymerization of Ethene/propene in a Stirred Fixed Bed Reactor Use of the catalyst of Example 4 (EBTHIZrCl$_2$/MAO/hexylbenzene/MAO-SiO$_2$); catalyst use: 0.031 mmol Zr; PE polymerization complete after 0.7 hour.

For further information and results see Table I.

Example 22
Polymerization of Ethene and Subsequent Terpolymerization of Ethene/propene/ENB in a Stirred Fixed Bed Reactor Use of the catalyst of Example 4 (EBTHIZrCl$_2$/MAO/hexylbenzene/MAO-SiO$_2$); catalyst use: 0.010 mmol Zr; PE polymerization complete after 2.0 hours; 8.5 wt. % ENB metered in.

For further information and results see Table I.

Example 23
Polymerization of Ethene and Subsequent Copolymerization of Ethene/propene in a Stirred Fixed Bed Reactor Use of the catalyst of Example 5 (EBTHIZrCl$_2$/MAO/ dodecylbenzene/MAO-SiO$_2$); catalyst use: 0.010 mmol Zr; PE polymerization complete after 0.5 hour.

For further information and results see Table I.

Example 24
Polymerization of Ethene and Copolymerization of Ethene/propene in a Stirred Fixed Bed Reactor Use of the catalyst of Example 6 (EBTHIZrCl2/MAO/ tetrahydronaphthalene/MAO-SiO$_2$); catalyst use: 0.019 mmol Zr; PE polymerization complete after 0.5 hour.

For further information and results see Table I.

Example 25
Polymerization of Ethene and Subsequent Copolymerization of Ethene/propene in a Stirred Fixed Bed Reactor Use of the catalyst of Example 7 (EBTHIZrCl$_2$/MAO/ decahydronaphthalene/MAO-SiO$_2$); catalyst use: 0.009 mmol Zr; PE polymerization complete after 0.7 hour.

For further information and results see Table I.

Example 26
Polymerization of Ethene and Subsequent Copolymerization of Ethene/propene in a Stirred Fixed Bed Reactor Use of the catalyst of Example 8 (EBTHIZrCl$_2$/ butylbenzene/MAO-SiO$_2$); catalyst use: 0.009 mmol Zr; PE polymerization complete after 0.5 hour.

For further information and results see Table I.

Example 27
Polymerization of Ethene and Subsequent Copolymerization of Ethene/propene in a stirred Fixed Bed Reactor Use of the catalyst of Example 9 (EBTHIZrCl$_2$/1,4-diisobutylbenzene/MAO-SiO$_2$); catalyst use: 0.009 mmol Zr; PE polymerization complete after 0.5 hour.

For further information and results see Table I.

Example 28
Polymerization of Ethene and Subsequent Copolymerization of Ethene/propene in a Stirred Fixed Bed Reactor Use of the catalyst of Example 10 (EBTHIZrCl$_2$/ hexylbenzene/MAO-SiO$_2$); catalyst use: 0.010 mmol Zr; PE polymerization complete after 0.5 hour.

For further information and results see Table I.

Example 29
Polymerization of Ethene and Subsequent Copolymerization of Ethene/propene in a Stirred Fixed Bed Reactor Use of the catalyst of Example 11 (EBTHIZrCl$_2$/ tetrahydronaphthalene/MAO-SiO$_2$); catalyst use: 0.015 mmol Zr; PE polymerization complete after 0.8 hour.

For further information and results see Table I.

Example 30
Polymerization of Ethene and Subsequent Copolymerization of Ethene/propene in a Stirred Fixed Bed Reactor Use of the catalyst of Example 12 (EBTHIZrCl$_2$/MAO/ 1,4-diisopropylbenzene/TEA-SiO$_2$); catalyst use: 0.016 mmol. Zr; PE polymerization complete after 0.5 hour.

For further information and results see Table I.

Example 31
Polymerization of Ethene and Subsequent Terpolymerization of Ethene/propene/ENB in a Stirred Fixed Bed Reactor Use of the catalyst of Example 12 (EBTHIZrCl$_2$/MAO/ 1,4-diisopropylbenzene/TEA-SiO$_2$); catalyst use: 0.019 mmol. Zr; PE polymerization complete after 0.5 hour; 7.0 wt. % ENB metered in.

For further information and results see Table I.

Example 32
Polymerization of Ethene and Subsequent Copolymerization of Ethene/propene in a Stirred Fixed Bed Reactor Use of the catalyst of Example 13 (EBTHIZrCl$_2$/1,4-diisopropylbenzene/TEA-SiO$_2$); catalyst use: 0.024 mmol Zr; PE polymerization complete after 0.5 hour.

For further information and results see Table I.

Example 33
Polymerization of Ethene and Subsequent Copolymerization of Ethene/propene in a Stirred Fixed Bed Reactor Use of the catalyst of Example 14 (EBTHIZrCl$_2$/DAB/ butylbenzene/MAO-SiO$_2$); catalyst use: 0.011 mmol Zr; PE polymerization complete after 0.5 hour.

For further information and results see Table I.

Example 34
Polymerization of Ethene and Subsequent Copolymerization of Ethene/propene in a Stirred Fixed Bed Reactor Use of the catalyst of Example 15 (EBTHIZrCl$_2$/DAB/ tetrahydronaphthalene/MAO-SiO$_2$); catalyst use: 0.015 mmol. Zr; PE polymerization complete after 0.5 hour.

For further information and results see Table I.

Example 35
Polymerization of Ethene and Subsequent Copolymerization of Ethene/propene in a Stirred Fixed Bed Reactor Use of the catalyst of Example 16 (EBTHIZrCl$_2$/TPB/ butylbenzene/MAO-SiO$_2$); catalyst use: 0.020 mmol Zr; PE polymerization complete after 0.5 hour.

For further information and results see Table I.

Example 36
Polymerization of Ethene and Subsequent Copolymerization of Ethene/propene in a Stirred Fixed Bed Reactor Use of the catalyst of Example 17 (DADNiBr$_2$/MAO/ butylbenzene/MAO-SiO$_2$); catalyst use: 0.093 mmol. Ni; PE polymerization complete after 0.5 hour.

For further information and results see Table I.

TABLE 1

| Example | Al/Zr | Productivity PE g/h | Activity PE g/h*bar*mmol | Productivity EPM g/h | Activity EPM g/h*bar*mmol |
|---|---|---|---|---|---|
| 18 | 635 | 13.4 | 270 | 63.5 | 1000 |
| 19 | 630 | 20 | 180 | 77.3 | 880 |
| 20 | 630 | 43.7 | 194 | | |
| 21 | 633 | 42.6 | 173 | 81.8 | 530 |

TABLE 1-continued

| Example | | | | | |
|---|---|---|---|---|---|
| 22 | 633 | 10.7 | 221 | | |
| 23 | 632 | 14.8 | 234 | 59.3 | 1380 |
| 24 | 633 | 26 | 290 | 40.5 | 390 |
| 25 | 613 | 31.5 | 480 | 42.4 | 1290 |
| 26 | 361 | 11.6 | 232 | 27.8 | 560 |
| 27 | 360 | 8.8 | 167 | 26.2 | 570 |
| 28 | 360 | 6.4 | 102 | 28.4 | 290 |
| 29 | 360 | 87.2 | 1513 | 73.3 | 900 |
| 30 | 315 | 10.5 | 168 | 34.6 | 290 |
| 31 | 315 | 12.2 | 129 | | |
| 32 | 45 | 2.4 | 0 | 20.3 | 156 |
| 33 | 365 | 13.8 | 243 | 32.68 | 560 |
| 34 | 370 | 13 | 160 | 33.7 | 430 |
| 35 | 400 | 10.8 | 89 | 24.8 | 225 |
| 36 | 626 | 46.8 | 89 | 17.9 | 51 |

| Example | Productivity EPDM g/h | Activity EPDM g/h*bar/mmol | Run time h | E/P wt. % | E/P/ENB wt. % |
|---|---|---|---|---|---|
| 18 | | | 6.25 | 71.5/28.5 | |
| 19 | | | 4.8 | 72.8/27.2 | |
| 20 | 86.8 | 650 | 1.6 | | 82.2/9.3/8.5 |
| 21 | | | 2.5 | 70.4/29.6 | |
| 22 | 27.9 | 280 | 5.9 | | 83.5/12.2/4.3 |
| 23 | | | 4.7 | 69.2/30.8 | |
| 24 | | | 4.8 | 76.8/23.2 | |
| 25 | | | 4 | 73.5/26.5 | |
| 26 | | | 5 | 86.1/13.9 | |
| 27 | | | 5.7 | 70.7/29.3 | |
| 28 | | | 7 | 74.7/25.3 | |
| 29 | | | 1.8 | 70.5/29.5 | |
| 30 | | | 1.7 | 83/17 | |
| 31 | 18.9 | 160 | 1.6 | | 77/19.5/3.5 |
| 32 | | | 3.4 | 82.7/17.3 | |
| 33 | | | 3.2 | 69.9/30.1 | |
| 34 | | | 3.8 | 70.8/29.2 | |
| 35 | | | 1 | 72.9/27.1 | |
| 36 | | | 2.2 | 100/0.0 | |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of supported polymerization catalyst systems comprising the steps of:
   a) dissolving at least one transition metal complex in a mixture of at least two different solvents having different boiling points to form a solution, wherein said at least one of said at least two different solvents is a higher boiling point solvent having a boiling point greater than 150° C. at room temperature and at atmospheric pressure,
   b) contacting said solution with at least one support material, the volume of the solution being sufficient to form a slurry with the support material(s), the volume of the higher-boiling solvent being less than or equal to the total pore volume of the support,
   c) removing more than 90% of the solvent having a lower boiling point; and
   d) adding at least one co-catalyst.

2. A process for the preparation of supported polymerization catalyst systems according to claim 1 wherein said at least one co-catalyst is added together with said at least one transition metal complex in said step a).

3. A process for the preparation of supported polymerization catalyst systems according to claim 1 wherein said at least one co-catalyst is applied to said at least one support material used in step b).

4. A process for the preparation of supported polymerization catalyst systems according to claim 1 wherein said at least one co-catalyst is added together with said at least one transition metal complex in said step a) and also applied to said at least one support material used in step b).

5. A process according to claim 1, wherein said mixture of at least two different solvents dissolves the components of said catalyst system, is inert toward said components and does not adversely affect said components' catalytic properties.

6. A supported polymerization catalyst system prepared by
   a) dissolving at least one transition metal complex in a mixture of at least two different solvents having different boiling points to form a solution, wherein at least one of said at least two different solvents is a higher boiling point solvent having a boiling point greater than 150° C. at room temperature and at atmospheric pressure,
   b) contacting said solution with at least one support material, the volume of the solution being sufficient to form a slurry with the support material, the volume of the higher-boiling solvent being less than or equal to the total pore volume of the support,
   c) removing more than 90% of the solvent having a lower boiling point, and
   d) adding at least one co-catalyst.

7. A process according to claim 1, wherein said mixture of at least two different solvents is selected from the group consisting of linear, or branched, aliphatic and aromatic hydrocarbons.

8. A process according to claim 7, wherein the solvent having the lower boiling point is selected from the group consisting of benzene, toluene, xylene, cumene and propylbenzene.

9. A process according to claim 7, wherein said higher boiling point solvent is selected from the group consisting of butylbenzene, hexylbenzene, dodecylbenzene, 1,3-diisopropylbenzene, 1,4-diisopropylbenzene and 1,2,3,4-tetrahydronaphthalene.

10. A process according to claim 1, characterized in that said at least one support material is selected from the group consisting of porous, particulate, organic and/or inorganic solids which are dimensionally stable in said at least two different solvents and have a pore volume in the range of from 0.1 to 15 ml/g.

11. A process according to claim 10 wherein said inorganic solids have a pore volume is from 0.1 to 15 ml/g, specific surface area from 10 to 1000 m$^2$/g, and particle size is from 10 to 2500 μm.

12. A process according to claim 10, wherein said at least one support material is selected from the group consisting of silica gels, precipitated silicas, clays, aluminosilcates, talcum, zeolites, carbon black, silicon dioxide, aluminum oxide, magnesium oxide, titanium dioxide, magnesium chloride, sodium chloride, lithium chloride, calcium chloride, zinc chloride and calcium carbonate.

* * * * *